Patented Oct. 18, 1949

2,485,528

UNITED STATES PATENT OFFICE 2,485,528

COMPOSITION FOR DESCALING FERROUS METAL SURFACES

Paul H. Cardwell, Tulsa, Okla., and Grover E. Mullin, Philadelphia, Pa., assignors to The Dow Chemical Company, Midland, Mich., a corporation of Delaware No Drawing. Application August 14, 1948, Serial No. 44,412

8 Claims. (Cl. 252—149)

The invention relates to compositions for removing scale deposits from ferrous metal surfaces. It more particularly concerns an improved composition comprising hydrochloric acid for use in removing scale deposits from iron or steel surfaces.

One of the well known uses of hydrochloric acid is the removal of scale deposits, such as those comprising the various iron oxides or other foreign matter soluble in the acid, by pickling the scaled surface with the acid. In as much as the acid also attacks and dissolves the metal underlying the deposits to be removed, a corrosion inhibitor is added which reduces the rate of attack of the acid upon the metal while the scale is being removed. In this connection, the organic nitrogen bases that are soluble in the acid generally have some effect in reducing the rate of attack upon the metal by the acid when present therein in comparatively small concentrations. However, when the deposits to be removed contain a ferric iron constituent, as when the scale contains ferric oxide, for example, the acid solution generally becomes additionally corrosive in spite of the presence of the aforementioned agents.

The added corrosion is occasioned by the fact that the ferric iron constituent of the scale is invariably reduced to ferrous iron on being dissolved by the acid, the reduction occurring at the expense of the underlying metal according to the stoichiometrical relation:

$$Fe + 2Fe^{+++} = 3Fe^{++}$$

This equation shows that for each 111.68 pounds of ferric iron constituent dissolved from the scale by the acid solution, 55.84 pounds of solid metal underlying the scale also dissolve.

The principal object of the invention is to provide a hydrochloric acid solution suitable for dissolving from ferrous metal surfaces scale containing a ferric iron constituent, with reduced attack upon the underlying metal. Other objects and advantages will appear as the description of the invention proceeds.

The invention is predicated upon the discovery that by including in the acid solution a soluble thiocyanate together with an acid soluble organic nitrogen base, scale containing a ferric iron constituent may be removed from a ferrous metal surface with greatly reduced attack upon the underlying metal, as compared to that obtained when the acid solution is used with either the soluble thiocyanate or the organic nitrogen base alone. The invention then consists in the scale-removing composition hereinafter more fully described and particularly pointed out in the claims.

In carrying out the invention, aqueous hydrochloric acid is used in a concentration suitable for decomposing, dissolving, or disintegrating the scale deposits to be removed from the ferrous metal surfaces, such as those of iron and steel. Complete solution of the scale is not always necessary. Some scale deposits contain both acid-soluble and insoluble constituents and usually slough off when attacked by the acid without completely dissolving. A concentration between about 5 and 25 per cent is usually suitable, although other concentrations can be used. A preferred concentration is about 10 per cent of hydrochloric acid by weight. Some of the higher concentrations are more difficult to inhibit against acid corrosion; hence the lowest HCl concentration that will effectively remove the scale is preferably used. To the acid solution is added an organic nitrogen base that inhibits acid corrosion. A large number of organic nitrogen bases are known which have the property of inhibiting the corrosive action of the acid on iron or steel. In general, it appears that any organic nitrogen base that is soluble in the acid solution may be used for this purpose. The common organic nitrogen bases used as inhibitors are the well known coal tar bases produced in the distillation of coal tar. If desired, the bases themselves may be separated 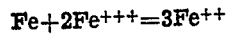 from the crude coal tar base mixtures and used as individual substances. The concentration or amount of the organic nitrogen base inhibitor to employ depends upon its effectiveness and the extent to which it is desired to suppress the corrosiveness of the acid and the temperature at which the acid solution is to be used. Generally the amount effective to inhibit or reduce acid corrosion is in the range of 0.1 to 1 per cent of the weight of the acid solution.

In order to suppress the added corrosiveness acquired by the acid solution as it dissolves ferric iron from the scale and tends to form ferric ions subject to reduction by metallic iron, we add to the acid solution, in accordance with the invention, in addition to the organic nitrogen base acid corrosion inhibitor, a water-soluble inorganic thiocyanate. Suitable soluble thiocyanates are the alkali metal thiocyanates and ammonium thiocyanate. The amount of the thiocyanate to use is preferably that calculated to be somewhat in excess of that stoichiometrically equivalent to the ferric iron to be dissolved by the acid in descaling the ferrous metal surface. To calculate the amount of ferric iron to be dissolved in a given scale-removal operation, one may resort to a conventional analysis of the scale giving the percentage of the ferric iron therein. From such an analysis and a knowledge of the area of the ferrous metal surface covered by the scale to be removed, an estimate of the total weight of ferric iron-forming material of the scale is computed on the assumption that during the acid treatment of the scale all the ferric iron-forming constituents therein will be dissolved by the acid solution. The stoichiometrically equivalent weight, or preferably 10 to 50 per cent in excess thereof, of soluble thiocyanate is then ascertained from the weight of ferric iron-forming material in accordance with the weight ratio of about 58 grams of thiocyanate (SCN) to 56 grams of ferric iron ($Fe^{+++}$).

For example, we have found that when the amount of ferric iron in the scale is sufficient to form a 1 per cent solution of iron in the descaling acid solution, approximately 1.0 per cent of ammonium thiocyanate or sodium or potassium thiocyanate is sufficient to be effective in reducing the attack upon the ferrous metal surface by the ferric iron. When there is less ferric iron in the scale, a smaller amount of thiocyanate may be used. Similarly, when larger amounts of ferric iron are present, larger amounts of thiocyanate are used. In general, the amount to use will lie between about 0.1 and 2.0 per cent of the weight of the solution.

Similarly, data as to the amount of acid-soluble material in the scale may be used to ascertain the quantity of acid needed. The amount of acid used is preferably subtantially in excess of actual needs. In some instances, in order to reach all the scale, as when treating the inside of a vessel having a large volume, a larger volume of acid solution may be required so as to fill the equipment than is actually needed for the amount of scale involved. This is usually the case in treating steam boilers.

The following data are illustrative of the effect of dissolved ferric iron in inhibited hydrochloric acid on its corrosiveness to ferrous metal. In obtaining these data, test pieces of mild steel 1 inch by 2 inches by 1/8 inch were submerged in 300 milliliters of 10 per cent hydrochloric acid solution at 150° F. for 16 hours, during which the solution was continuously slowly agitated, and the loss in weight of the test pieces due to attack by the acid solution was measured. From a number of such tests it was found that the average rate of weight loss was 0.683 pound per square foot per day in the hydrochloric acid alone. When similar test pieces were subjected to similar tests in the acid solution containing 1 per cent of ferric iron as ferric chloride, the rate of attack as measured by weight loss was 1.179 pounds per square foot per day. Thus, the presence of ferric iron in the acid solution increased its corrosiveness more than 72 per cent. Upon adding to the acid solution containing dissolved ferric iron both an organic nitrogen base soluble in the acid and an alkali metal or ammonium thiocyanate, in accordance with our invention, the corrosiveness of the solution is greatly reduced, the reduction in corrosiveness being greater than that obtainable with either of the foregoing types of agents alone. This is demonstrated in the following table of data, which not only shows the increased reductions in corrosiveness obtained by the combined use of the two types of agents, but also illustrates a wide variety of organic nitrogen bases that may be employed in this way and various concentrations at which the agents may be used. In obtaining the data, the same test procedure was used as that already mentioned in connection with determining the corrosiveness of hydrochloric acid with and without added ferric chloride.

TABLE

*Effect of combined use of an acid-soluble organic nitrogen base and a soluble thiocyanate on the corrosion rate of mild steel held in 10% HCl containing 1% of $FeCl_3$ at 150° F. for 16 hours*

| Organic Nitrogen Base Inhibitor | | Amount of Ammonium Thiocyanate, Percent | Corrosion Rate in lbs. per sq. ft. per day |
|---|---|---|---|
| Name | Amount, Percent | | |
|  |  |  | 1.179 |
|  |  | 0.50 | 0.576 |
|  |  | 0.75 | 0.564 |
|  |  | 2.00 | 0.443 |
| Aniline | 0.4 |  | 1.050 |
|  | 0.4 | 0.50 | 0.103 |
|  | 0.4 | 0.75 | 0.080 |
|  | 0.4 | 2.00 | 0.049 |
| Methylaniline | 0.4 |  | 0.828 |
|  | 0.4 | 0.50 | 0.098 |
|  | 0.4 | 0.75 | 0.058 |
|  | 0.4 | 2.00 | 0.035 |
| Ethylaniline | 0.4 |  | 0.743 |
|  | 0.4 | 0.50 | 0.099 |
|  | 0.4 | 0.75 | 0.074 |
|  | 0.4 | 2.00 | 0.061 |
| n-Butylaniline | 0.4 |  | 0.569 |
|  | 0.4 | 0.75 | 0.055 |
| Dimethylaniline | 0.4 |  | 0.655 |
|  | 0.4 | 0.75 | 0.081 |
| Diethylaniline | 0.4 |  | 0.452 |
|  | 0.4 | 0.75 | 0.090 |
| Di-n-butylaniline | 0.4 |  | 0.151 |
|  | 0.4 | 0.75 | 0.052 |
| p-Toluidine | 0.4 |  | 0.835 |
|  | 0.4 | 0.50 | 0.092 |
|  | 0.4 | 0.75 | 0.065 |
|  | 0.4 | 2.00 | 0.048 |
| Pyridine | 0.4 |  | 0.858 |
|  | 0.4 | 0.50 | 0.122 |
|  | 0.4 | 0.75 | 0.110 |
|  | 0.4 | 1.75 | 0.094 |
|  | 0.4 | 2.00 | 0.100 |
| alpha-Picoline | 0.4 |  | 0.878 |
|  | 0.4 | 0.50 | 0.120 |
|  | 0.4 | 0.75 | 0.099 |
|  | 0.4 | 2.00 | 0.119 |
| beta-Picoline | 0.4 |  | 0.843 |
|  | 0.4 | 0.75 | 0.104 |
| gamma-Picoline | 0.4 |  | 0.831 |
|  | 0.4 | 0.75 | 0.099 |
| 2-n-Amylpyridine | 0.4 |  | 0.577 |
|  | 0.4 | 0.75 | 0.127 |
| 4-n-Amylpyridine | 0.4 |  | 0.493 |
|  | 0.4 | 0.75 | 0.130 |
| 2-Hexylpyridine | 0.4 |  | 0.274 |
|  | 0.4 | 0.75 | 0.076 |
| 2,4-Lutidine | 0.4 |  | 0.740 |
|  | 0.4 | 0.75 | 0.095 |
| 2,6-Lutidine | 0.4 |  | 0.738 |
|  | 0.4 | 0.75 | 0.098 |
| 2,4,6-Collidine | 0.4 |  | 0.405 |
|  | 0.4 | 0.50 | 0.086 |
|  | 0.4 | 0.75 | 0.065 |
|  | 0.4 | 1.75 | 0.041 |
|  | 0.4 | 2.00 | 0.043 |
| Quinoline | 0.4 |  | 0.330 |
|  | 0.4 | 0.75 | 0.083 |
| Lepidine | 0.4 |  | 0.203 |
|  | 0.4 | 0.75 | 0.075 |
| Quinaldine | 0.4 |  | 0.166 |
|  | 0.4 | 0.50 | 0.084 |
|  | 0.4 | 0.75 | 0.058 |
|  | 0.4 | 1.75 | 0.046 |
|  | 0.4 | 2.00 | 0.051 |

TABLE—Continued

| Organic Nitrogen Base Inhibitor | | Amount of Ammonium Thiocyanate, Percent | Corrosion Rate in lbs. per sq. ft. per day |
|---|---|---|---|
| Name | Amount, Percent | | |
| 2,7-Dimethylquinoline | 0.4 | ------ | 0.219 |
|  | 0.4 | 0.75 | 0.092 |
| Isoquinoline | 0.4 | ------ | 0.282 |
|  | 0.4 | 0.75 | 0.086 |
| 3-Methylisoquinoline | 0.4 | ------ | 0.275 |
|  | 0.4 | 0.50 | 0.103 |
|  | 0.4 | 0.75 | 0.076 |
|  | 0.4 | 1.50 | 0.061 |
|  | 0.4 | 2.00 | 0.065 |
| Acridine | Saturated Solution, >0.4% | ------ | 0.486 |
|  |  | 0.50 | 0.145 |
|  |  | 0.75 | 0.151 |
|  |  | 2.00 | 0.058 |

The table gives in the first column the name of the organic nitrogen base inhibitor employed; the second column its amount in per cent by weight; the third column gives the amount of ammonium thiocyanate, if any, in per cent by weight, added to the acid solution; and the fourth, the rate of corrosion of the test pieces by the acid solution, expressed in pounds per square foot of surface exposed to the acid solution per day. It will be observed that in the first entry of the table that 10 per cent aqueous hydrochloric acid solution containing 1 per cent of ferric chloride corrodes mild steel at the rate of 1.179 pounds per square foot per day, and in the next three lines this rate may be decreased by the addition of various amounts, viz. 0.5, 0.75, and 2 per cent by weight, of ammonium thiocyanate to the acid solution to 0.576, 0.564, and 0.443 pound per square foot per day respectively. The effect of various organic nitrogen bases alone in the acid and in combination with the foregoing amounts of ammonium thiocyanate on the corrosion rate is shown in the subsequent entries. For example, referring to the entries concerning aniline, when aniline in the amount of 0.4 per cent is present in the acid containing the ferric chloride, the rate of corrosion is decreased from 1.179 to 1.105 pounds per square foot per day. When the foregoing amounts of both the ammonium thiocyanate (i. e. 0.50 per cent, 0.75 per cent, and 2.00 per cent) and the aniline (0.4 per cent) are used together in the acid containing 1 per cent of ferric chloride, the rate of corrosion is decreased to 0.103, 0.080, and 0.049 pound per square foot per day respectively. The remaining entries concerning the effect of other organic nitrogen bases alone and combined with ammonium thiocyanate may be compared in similar manner. In each instance the combined use of the organic nitrogen base inhibitor and the soluble thiocyanate produces a greater reduction in corrosiveness than that obtainable from either of the agents used alone in the acid solution. Similar results have been observed when an alkali metal thiocyanate such as sodium and potassium thiocyanate is used in place of the ammonium thiocyanate and when other proportions of the organic nitrogen base are used.

In using our improved descaling composition, it may be brought into contact with the surface to be descaled in any suitable manner, as by immersing the article bearing the scale in the composition or otherwise inundating the scaled surface. Scaled insides of vessels are readily descaled by filling the vessels with the composition, which is allowed to remain in contact with the scale until dissolved, loosened, or sloughed off. Descaling usually is accomplished in a few minutes to several hours, depending upon the nature and composition of the scale. It is preferable to use the composition at elevated temperature, such as from about 100° F. to 160° F., although other temperatures may be used. The lowest temperatures at which reasonably rapid descaling is had are used preferably. After the action of the descaling solution is completed the surface may be drained and rinsed with water. It is desirable to use as a final rinse a dilute alkaline solution such as a 1 per cent aqueous solution of sodium carbonate.

The composition has the advantage of effectively attacking and removing scale deposits from ferrous metal surfaces with greatly reduced attack upon the underlying metal when the deposits contain a ferric ion-forming constituent.

This application is a continuation-in-part of our application Serial No. 608,612, filed August 2, 1945 now abandoned.

We claim:

1. A composition for descaling a ferrous metal surface comprising an aqueous solution containing from about 5 to 25 per cent of HCl, from about 0.1 to 1 per cent of an organic nitrogen base soluble in hydrochloric acid selected from the group consisting of the aromatic and heterocyclic nitrogen bases, and from about 0.1 to 2 per cent of a water-soluble thiocyanate.

2. A composition according to claim 1 in which the water-soluble thiocyanate is ammonium thiocyanate.

3. A composition according to claim 1 in which the water-soluble thiocyanate is potassium thiocyanate.

4. A composition according to claim 1 in which the water-soluble thiocyanate is sodium thiocyanate.

5. A composition for descaling a ferrous metal surface comprising an aqueous solution containing from about 5 to 25 per cent of HCl, from about 0.1 to 1 per cent of p-toluidine, and from about 0.1 to 2 per cent of a water-soluble thiocyanate.

6. A composition for descaling a ferrous metal surface comprising an aqueous solution containing from about 5 to 25 per cent of HCl, from about 0.1 to 1 per cent of 2,4,6-collidine, and from about 0.1 to 2 per cent of a water-soluble thiocyanate.

7. A composition for descaling a ferrous metal surface comprising an aqueous solution containing from about 5 to 25 per cent of HCl, from about 0.1 to 1 per cent of methylaniline, and from about 0.1 to 2 per cent of a water-soluble thiocyanate.

8. A composition for descaling a ferrous metal surface comprising an aqueous solution containing from about 5 to 25 per cent of HCl, from about 0.1 to 1 per cent of p-toluidine, and from about 0.1 to 2 per cent of ammonium thiocyanate.

PAUL H. CARDWELL.
GROVER E. MULLIN.

No references cited.